(12) United States Patent
Black et al.

(10) Patent No.: US 10,486,803 B2
(45) Date of Patent: Nov. 26, 2019

(54) SYSTEMS AND METHODS FOR STRUCTURAL HEALTH MONITORING AND PROTECTION

(71) Applicant: LORD Corporation, Cary, NC (US)

(72) Inventors: Paul Black, Fuquay-Varina, NC (US); Douglas Swanson, Cary, NC (US); Douglas G. Pedersen, Apex, NC (US); Mark R. Jolly, Raleigh, NC (US); Christopher Townsend, Shelburne, VT (US); Ian Cassidy, Durham, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/303,083

(22) PCT Filed: Apr. 15, 2015

(86) PCT No.: PCT/US2015/025963
§ 371 (c)(1),
(2) Date: Oct. 10, 2016

(87) PCT Pub. No.: WO2015/160945
PCT Pub. Date: Oct. 22, 2015

(65) Prior Publication Data
US 2018/0170532 A1 Jun. 21, 2018

Related U.S. Application Data

(60) Provisional application No. 61/979,551, filed on Apr. 15, 2014.

(51) Int. Cl.
*B06B 1/16* (2006.01)
*B64C 27/00* (2006.01)
(Continued)

(52) U.S. Cl.
CPC ............ *B64C 27/001* (2013.01); *B64D 45/00* (2013.01); *G01M 5/0033* (2013.01);
(Continued)

(58) Field of Classification Search
CPC ............................ B64C 27/001; B64D 45/00
See application file for complete search history.

(56) References Cited

U.S. PATENT DOCUMENTS 5,219,143 A * 6/1993 Staple ................... B64C 27/001
244/17.11
5,383,133 A * 1/1995 Staple ................... B64C 27/001
340/963
(Continued)

FOREIGN PATENT DOCUMENTS

EP 0 541 277 5/1993

OTHER PUBLICATIONS

SAE International, The Engineering Society for Advancing Mobility Land See Air and Space, Aerospace Recommended Practice, SAE ARP 4761, Issued Dec. 1996, 331 pgs.

*Primary Examiner* — Jess Whittington (57) ABSTRACT

Structural health monitoring and protection systems and methods are provided. System and methods utilize structural information and/or enhanced built in testing capabilities for detecting failure modes that may cause damage to a structure. Systems and methods herein may protect a structure by mitigating one or more incorrect forces. The structure may be an aircraft, a rotary wing aircraft, or any other physical structure subject to vibrations and receptive to canceling of those vibrations.

15 Claims, 8 Drawing Sheets

(51) Int. Cl.
  G01M 5/00   (2006.01)
  B64D 45/00   (2006.01)
(52) U.S. Cl.
  CPC ..... G01M 5/0066 (2013.01); *B64C 2027/002* (2013.01); *B64C 2027/004* (2013.01); *B64C 2027/005* (2013.01); *B64D 2045/0085* (2013.01)

(56) References Cited

U.S. PATENT DOCUMENTS

| | | | | |
|---|---|---|---|---|
| 6,354,152 | B1 * | 3/2002 | Herlik | G01N 29/223 73/597 |
| 6,467,723 | B1 * | 10/2002 | Rossetti | B64C 27/001 244/1 N |
| 8,162,606 | B2 * | 4/2012 | Jolly | B64C 27/001 416/1 |
| 9,284,048 | B2 * | 3/2016 | Harrigan | B64C 27/001 |
| 2005/0273277 | A1 * | 12/2005 | Ridnour | G01M 17/007 702/42 |
| 2006/0083617 | A1 * | 4/2006 | Jolly | B64C 27/001 416/133 |
| 2010/0221110 | A1 * | 9/2010 | Jolly | B64C 27/001 416/31 |
| 2011/0054721 | A1 * | 3/2011 | Goodrich | G05B 23/0283 701/14 |
| 2011/0057071 | A1 * | 3/2011 | Sahasrabudhe | G05D 1/0858 244/17.13 |
| 2012/0323410 | A1 * | 12/2012 | Bendisch | G01M 5/0033 701/3 |
| 2014/0365638 | A1 * | 12/2014 | Shah | H04L 41/147 709/224 |
| 2015/0007666 | A1 * | 1/2015 | Tucker | G05B 23/0283 73/787 |
| 2015/0274313 | A1 * | 10/2015 | Conrad | B64D 45/00 701/31.9 |
| 2016/0165377 | A1 * | 6/2016 | Beran | H04W 4/70 370/241 |

* cited by examiner

SYSTEMS AND METHODS FOR STRUCTURAL HEALTH MONITORING AND PROTECTION

CROSS-REFERENCE TO RELATED APPLICATION

The present application claims priority to U.S. Provisional Patent Application Ser. No. 61/979,551, filed Apr. 15, 2014, the disclosure of which is incorporated herein by reference in its entirety.

TECHNICAL FIELD

The subject matter herein generally relates to the field of structural health monitoring and protection of a structure. More specifically, the subject matter herein relates to systems and methods for structural heath monitoring and protection of an aircraft structure by mitigating incorrect forces using structural health monitoring and/or built in testing of an active vibration control (AVC) system. In addition, the subject matter herein relates to the creation of a mutually beneficial interaction between an AVC system, a health monitor system, and other electronic systems.

BACKGROUND

Active Vibration Control (AVC) systems on aircraft and other mechanical structures use various types of force generators (FGs). These FGs are used to produce vibratory loads for the purposes of reducing vibration based on accelerometer feedback. In many cases, and in the specific case of an aircraft, these FGs have the authority to impact loads and stresses within critical structural members such as gearbox struts, structural frames, engine supports, engine casings, drive train members, mechanical transmissions, control rods, the mast, and tail boom members. An undesired potential impact to the structure is that the AVC may reduce the life of structural components during normal operation or under AVC failure conditions.

What is needed is an AVC system that also includes structural health monitoring and protection capabilities and/or enhanced built in test capabilities for detecting failure modes (e.g., incorrect force) that could cause damage to the structure.

SUMMARY

Systems and methods for structural health monitoring and protection, in some aspects, via incorrect force mitigation are provided. In one exemplary embodiment, a structural health monitoring and protection system comprises an Active Vibration Control (AVC) system and a Structural Health Monitoring (SHM) system. The AVC system comprises at least one force generator (FG), at least one sensor configured to generate a signal upon detecting a structural vibration, and a controller in electronic communication with each of the at least one FG and the at least one sensor. In one aspect, the controller is configured to receive the signal, generate at least one force command, and electrically communicate the at least one force command to the at least one FG, the electronic communication providing for cancelling the structural vibration. The SHM system comprises at least one structural health sensor configured to measure a structural load, strain, or vibration. The system further comprises a communication interface disposed between the AVC system and the SHM system for facilitating electronic communications therebetween.

In certain embodiments, the system includes force generators (FGs), circular FGs (CFGs), linear FGs, or a combination of at least one CFG and at least one linear FG. In certain embodiments, the sensor for measuring structural vibration can comprise at least one accelerometer. In certain embodiments, the at least one structural health sensor comprises at least one strain gauge, at least one tachometer, at least one load measurement node, or at least one accelerometer. In certain embodiments, the communications interface is wired, wireless, or a databus. In certain embodiments, the controller is configured to correlate the structural vibration with the structural load or the structural strain for mitigating incorrect forces applied to a structure. In certain embodiments, the SHM system is configured to indicate an exceedance of a structural limit and provide an estimate of a remaining useful component life of an aircraft component. In certain embodiments, the SHM system is configured to detect a failure of the AVC system via the at least one structural health sensor and disable the at least one FG when the failure is detected. In certain embodiments, the controller is configured to adjust the at least one force command using information communicated by the SHM system for staying below a critical structural load limit.

In one exemplary embodiment, a method of providing structural health monitoring and protection is provided. The method comprises, providing an Active Vibration Control (AVC) system and at least one SHM system, communicating structural health information from the SHM system to the AVC system via a communications interface disposed therebetween, and correlating the structural vibration with the structural health information for mitigating incorrect forces applied to a structure.

In a further exemplary embodiment, an incorrect force mitigation system is provided. The incorrect force mitigation system comprises an AVC system comprising a controller. The controller is configured to detect an incorrect force by either (i) correlating a structural vibration with a structural load or a structural strain measurement received from a Structural Health Monitoring (SHM) system or (ii) conducting an initialized built in test (IBIT) by applying a computed setpoint disturbance, turning on a vibration control algorithm, switching the vibration control algorithm off, and running a fault identification algorithm.

Numerous objects and advantages of the inventive subject matter will become apparent as the following detailed description of the preferred embodiments is read in conjunction with the drawings, which illustrate such embodiments.

DETAILED DESCRIPTION

Figures (also "FIGS.") 1 to 7 illustrate various views, embodiments and/or aspects associated with structural health monitoring and protection and related methods by which the life of a structure and/or components thereof may be extended. In some embodiments, systems and methods described herein capitalize upon the mutually beneficial passage of information (e.g., bi-directionally) between an Active Vibration Control (AVC) system and a Structural Health Monitoring (SHM) system, and using such information to provide structural health monitoring and protection, in some aspects, by mitigating incorrect force(s). Mitigating incorrect forces extends the life of structures and/or critical components thereof.

As described herein, incorrect force may be detected upon monitoring vibrations emitted by FGs, monitoring vibration at other locations of a structure via SHM systems, etc. Incorrect force may also be detected via localized built in testing of an AVC system. In some embodiments, sensors are placed about the structure to monitor stresses, strains, and/or fatigue loads to determine when vibration limits are exceeded, detect abnormal vibration trends, and/or estimate fatigue load. In response to detecting a failure, the incorrect force is mitigated by reducing FG force, shutting down the AVC system, alerting the operators (e.g., pilots and crew), and/or otherwise reducing vibration/loads at various locations of a structure, as needed.

As used herein, the terms "processing unit" and "controller" each refer to physical devices including hardware in combination with software and/or firmware. Processing units and controllers include at least one hardware processor for executing instructions stored within a memory element thereof for implementing incorrect force mitigation as described herein.

As used herein, the term "module" refers to hardware, firmware, or software in combination with hardware and/or firmware for implementing features described herein.

Referring to FIGS. 1A-4, a non-limiting exemplary embodiment of an incorrect force mitigation system (IFMS), generally designated 100, is illustrated. As illustrated, IFMS 100 includes at least two aviation-based systems or subsystems (e.g., 200, 300, 400, etc.) configured to bi-directionally exchange information for use in mitigating incorrect forces applied to a structure, generally designated S. In the non-limiting examples herein, the mutually beneficial interaction of aircraft subsystems, not limited to an Active Vibration Control (AVC) system 200 and a Structural Health Monitoring (SHM) system 300 are shown and described. If FIGS. 1A-4, structure S is illustrated as a rotary wing aircraft, but Structure S may be any aircraft, including, a single rotor helicopter, a tandem rotor helicopter, a tiltrotor aircraft, as well as being any other physical structure subject to vibrations and receptive to canceling of those vibrations.

IFMS 100 is configured to detect and mitigate incorrect forces, such as those forces having a magnitude and/or phase that increase vibration and/or structural stress on a structure instead of reducing it. Incorrect forces may have an incorrect magnitude, frequency, amplitude, and/or phase that is applied to a structure by an AVC system (e.g., via the FGs) as a result of a sensor malfunction, a hardware malfunction, a FG malfunction, an incorrect reference signal, or the like. Exemplary sources of and/or contributors to incorrect force may include one or more accelerators not working properly, electronic and/or mechanical interfaces associated with various hardware components not working properly, a malfunction at an AVC controller, an incorrect transfer function from force to acceleration (e.g., incorrect System Model), an electronic or mechanical failure of the FG, or the like.

Figure 1A:
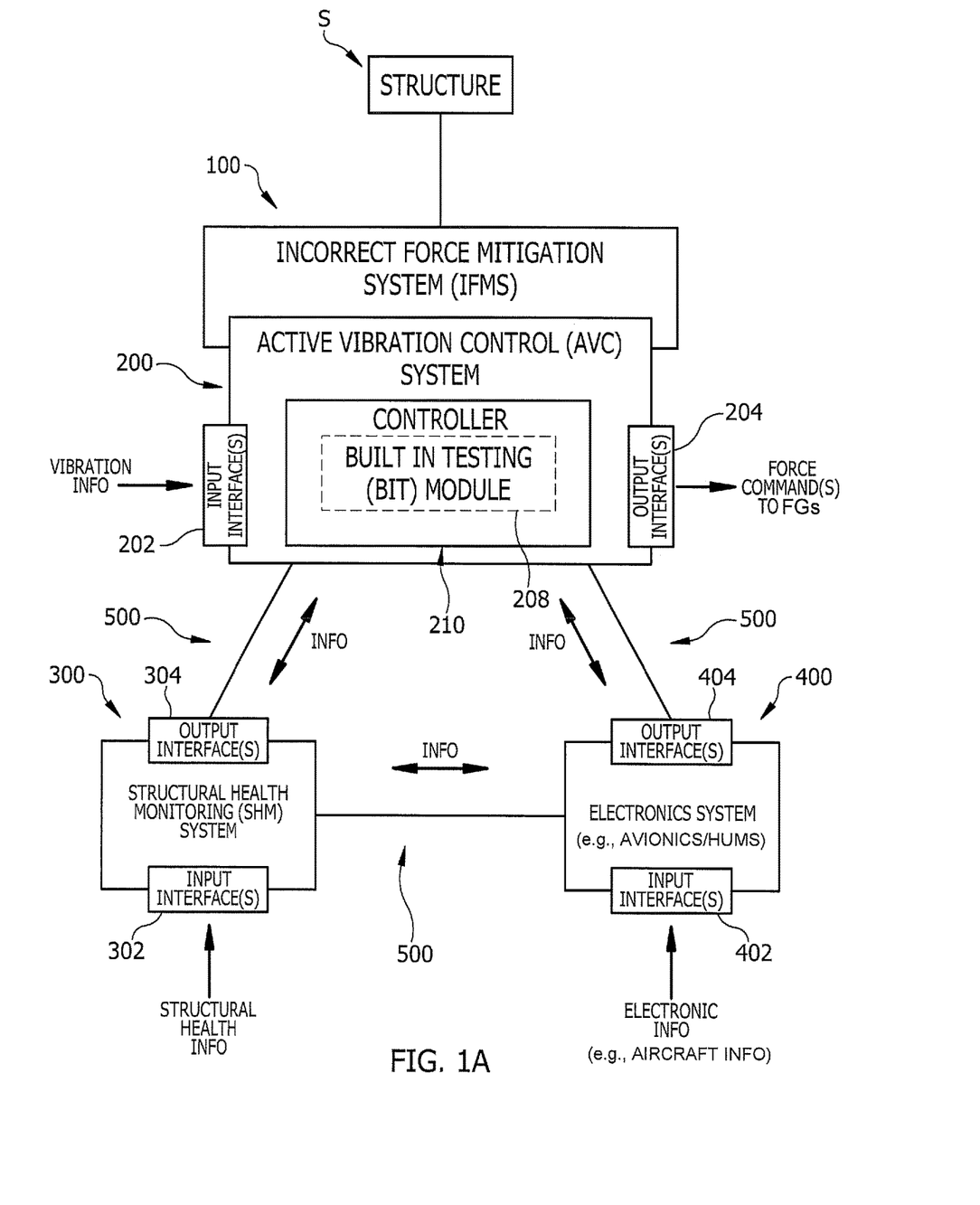
FIG. 1A is a schematic illustration and exemplary embodiment of aspects pertaining to structural health monitoring and protection via an incorrect force mitigation system.

Referring to FIG. 1A, IFMS 100 includes one or more subsystems configured to bi-directionally exchange data or information via an electronic interface (for use in mitigating incorrect forces applied to structure S. The electronic interface may be wired or wireless and it may be from source such as databases, datalinks or other similar systems. IFMS 100 includes multiple subsystems, not limited to AVC system 200, SHM system 300, and one or more electronics systems 400. Electronics system 400 may include any additional system for inputting any type of electronic information regarding electrical components and/or systems of structure S, and may include an avionics system (e.g., such as onboard Flight Controls or Health Usage and Monitory Systems or "HUMS"). Each subsystem of IFMS 100 electrically communicates with the other subsystems via one or more electronic communication interfaces 500, such as but not limited to one or more data busses, wired interfaces, wireless interfaces, or the like.

In some embodiments, AVC system 200 includes one or more input interfaces 202 configured to receive vibration information from one or more input sources (e.g., sensors) and one or more output interfaces 204 configured to output force commands to one or more force generators (FGs), not limited to one or more circular force generators (CFGs), or linear FGs, or a combination of at least one CFG and at least one linear FG. AVC system 200 may include an AVC controller 210 configured to process vibration information (e.g., electronic signals received from AVC sensors) received at interfaces 202 and generate force commands, and output the generated force commands to a plurality of FGs. As illustrated, controller 210 determines the cancelling forces and sends them to the FGs. Force commands are electronic communications that provide for canceling the structural vibration detected via AVC sensors (e.g., accelerometers).

As FIG. 1A illustrates, controller 210 is in electronic communication (e.g., wired and/or wireless communication) with at least one FG and at least one sensor (e.g., accelerometers) to assess and cancel structural vibration. In the embodiments illustrated in FIGS. 2-4, force commands generated at controller 210 include electronic signals that are communicated, forwarded, or otherwise transmitted to one or more FGs. The FGs receive the force commands and generate vibrations according to a force, phase, frequency, and/or amplitude specified in force commands communicated from controller 210. FGs are configured to generate and apply vibrations to structure S for counteracting, cancelling, and/or otherwise mitigating the vibration on the structure S. In some embodiments, FGs apply a force to structure S for counteracting or canceling vibration caused by one or more rotating components associated with structure S (e.g., rotors, motors, blades, etc.). Where FGs apply an incorrect force, IFMS 100 is configured to detect, diagnose, and mitigate the incorrect force, for example, by disabling and/or shutting down power supplied to the one or more FGs, AVC controller 210, and/or AVC system 200.

AVC system 200 is electronically linked to and/or electronically communicates with plurality of additional subsystems for receiving additional information (i.e., in addition to the vibration information received from input sources) for use in detecting and mitigating incorrect force. IFMS 100 is configured to utilize the information exchanged between AVC system 200, SHM system 300, and optional electronics system(s) 400 to detect whether AVC system 200 is outputting and/or applying an incorrect force via the one or more FGs (e.g., FGs, FIGS. 2-4). In response to detecting an incorrect force, IFMS 100, or portions/components thereof, is configured to correct or mitigate the incorrect force by disabling power to the one or more FGs, re-computing force commands, etc. IFMS 100 may detect and correct/mitigate incorrect forces using information received from SHM system 300, electronics system 400, and/or by conducting a built in test (BIT) at AVC system 200. That is, AVC system 200 may mitigate incorrect force internally via a BIT module 208.

In some aspects, SHM system 300 includes one or more input interfaces 302 and one or more output interfaces 304. SHM system 300 receives structural health information via input sources (e.g., stress/strain gauges, sensors, signals, tachometers, accelerometers, piezo electronics, etc.) and exchanges the information with at least one other subsystem not limited to AVC system 200 and/or electronics system 400. AVC system 200 may utilize the structural health information to adjust force commands generated at controller 210 for mitigating incorrect force generation. In some embodiments, SHM system 300 is configured detect certain AVC failure modes that can affect the health of the structure through monitoring trends in the monitored sensor data. That is, SHM system 300 can monitor sensor data and detect/monitor trends. Should SHM system 300 detect an adverse trend (e.g., exceeded structural loads, etc.) then SHM system 300 can issue a command (e.g., via a SHM controller (SHMC) 308 FIGS. 3-4) to shut down FGs directly or SHM system 300 can indirectly shut down FGs via a command to controller 210.

In some aspects, AVC system 200 (e.g., via controller 210) can modify its control force solution and/or shut down FGs as needed in response to detection of AVC failure modes. In some embodiments, controller is configured to adjust the at least one force command using information communicated by the SHM system 300 for staying below a critical structural load limit. SHM system 300 is configured to detect, measure, and/or communicate any information regarding the health of a vibrating structure and/or components thereof, including but not limited to information regarding cracks, stiffness, elongation, vibration, stress, strain, load, or the like. For example, SHM monitoring system 300 may monitor structural health by measuring a crack, stiffness, an elongation, a vibration, a stress, a strain, or a load associated with a structure and/or any component thereof or associated therewith.

Still referring to FIG. 1A and in some embodiments, electronics system 400 includes one or more input interfaces 402 and one or more output interfaces 404. In one non-limiting example, electronics system 400 includes an avionics system configured to detect regime information via input sources (e.g., avionics sensors, tachometers, or the like) for detecting forward flight speed, main rotor speed, collective position (for helicopters), and/or engine torque. IFMS 100 can use this information to determine expected loading and transient conditions. Electronics system 400 can exchange the information received at input interfaces 402 with at least one other subsystem not limited to AVC system 200 and/or SHM system 300. IFMS 100 and/or a component thereof (e.g., AVC system 200) may utilize the electronic information (e.g., either alone and/or in addition to information from SHM 300) to adjust force commands generated at controller 210 and/or disable FGs for mitigating incorrect forces.

In some embodiments, SHM system 300 assists electronics system 400 in operating regime detection such as weight on wheels (WoW), gross vehicle weight, maneuver loading, etc., by communication of such information therebetween so that adjustments to flight controls may be made. In some embodiments, IFMS 100 utilizes information from AVC system 200, SHM system 300, and/or electronics system 400 to control vibration and mitigate incorrect force via adjustments to flight controls, adjustments to vibration control forces, and/or disconnecting one or more FGs.

Figure 2:
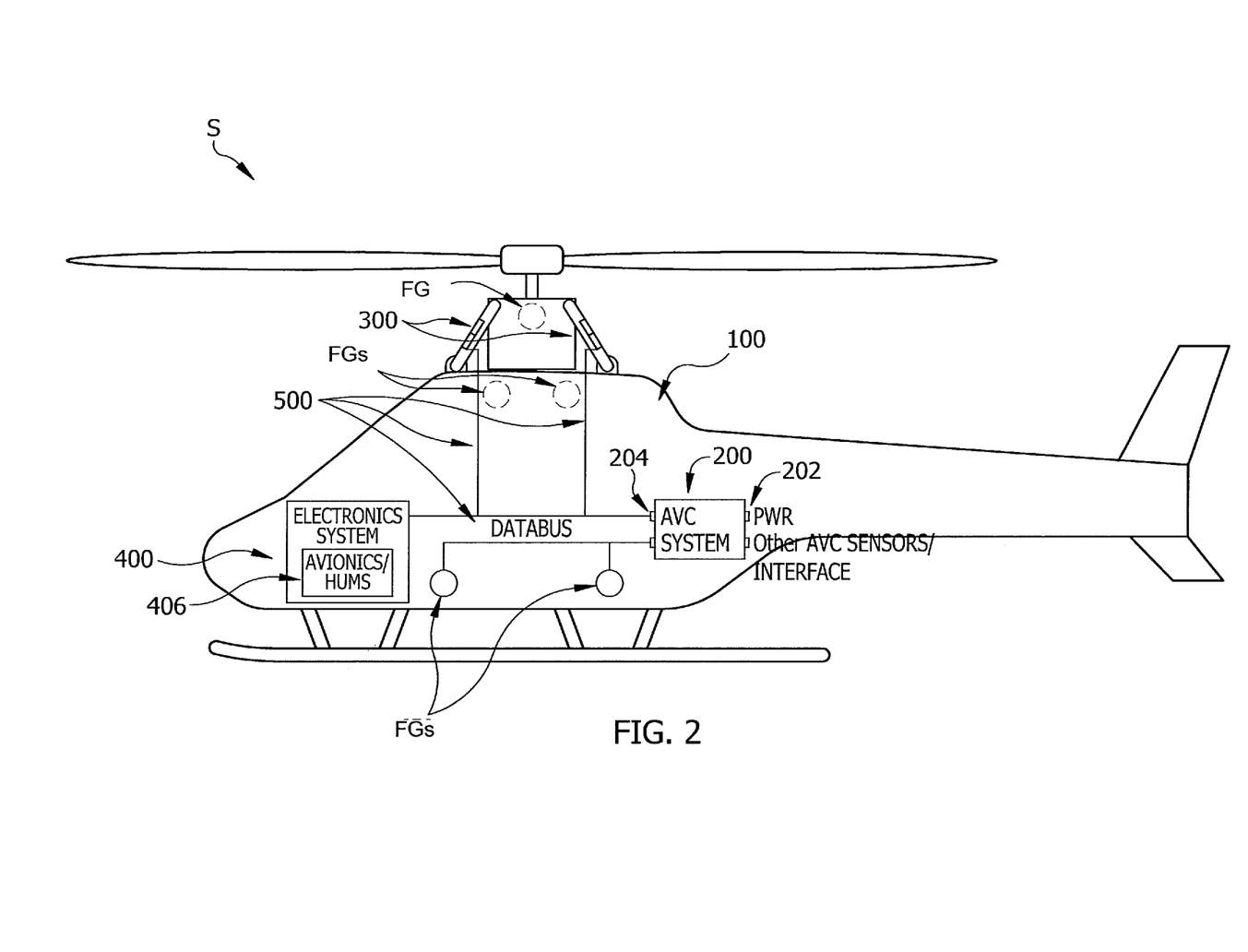
FIGS. 2 to 4 are schematic illustrations and exemplary embodiments of a helicopter having various subsystems for structural health monitoring and protection.
Figure 3:
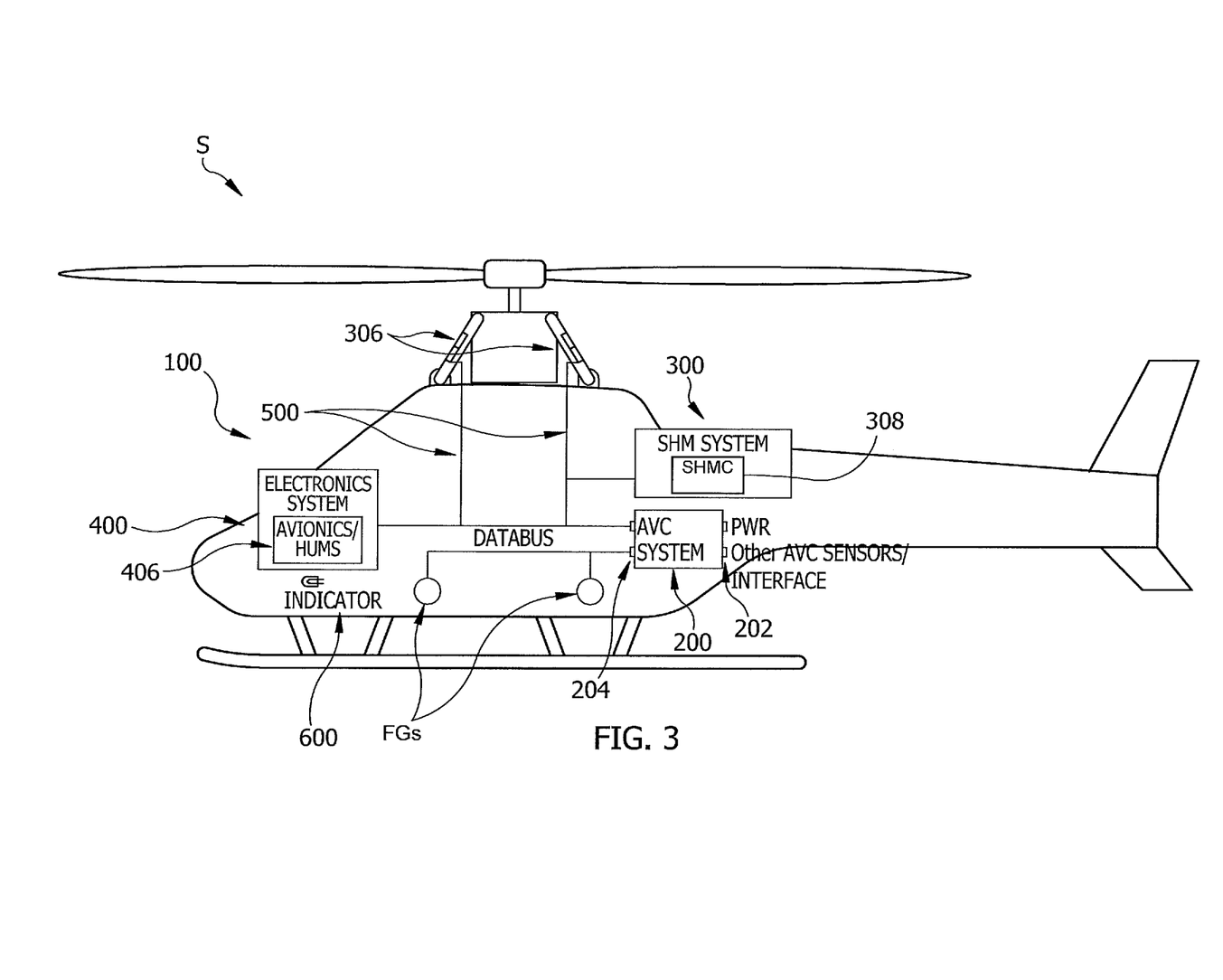
Figure 4:
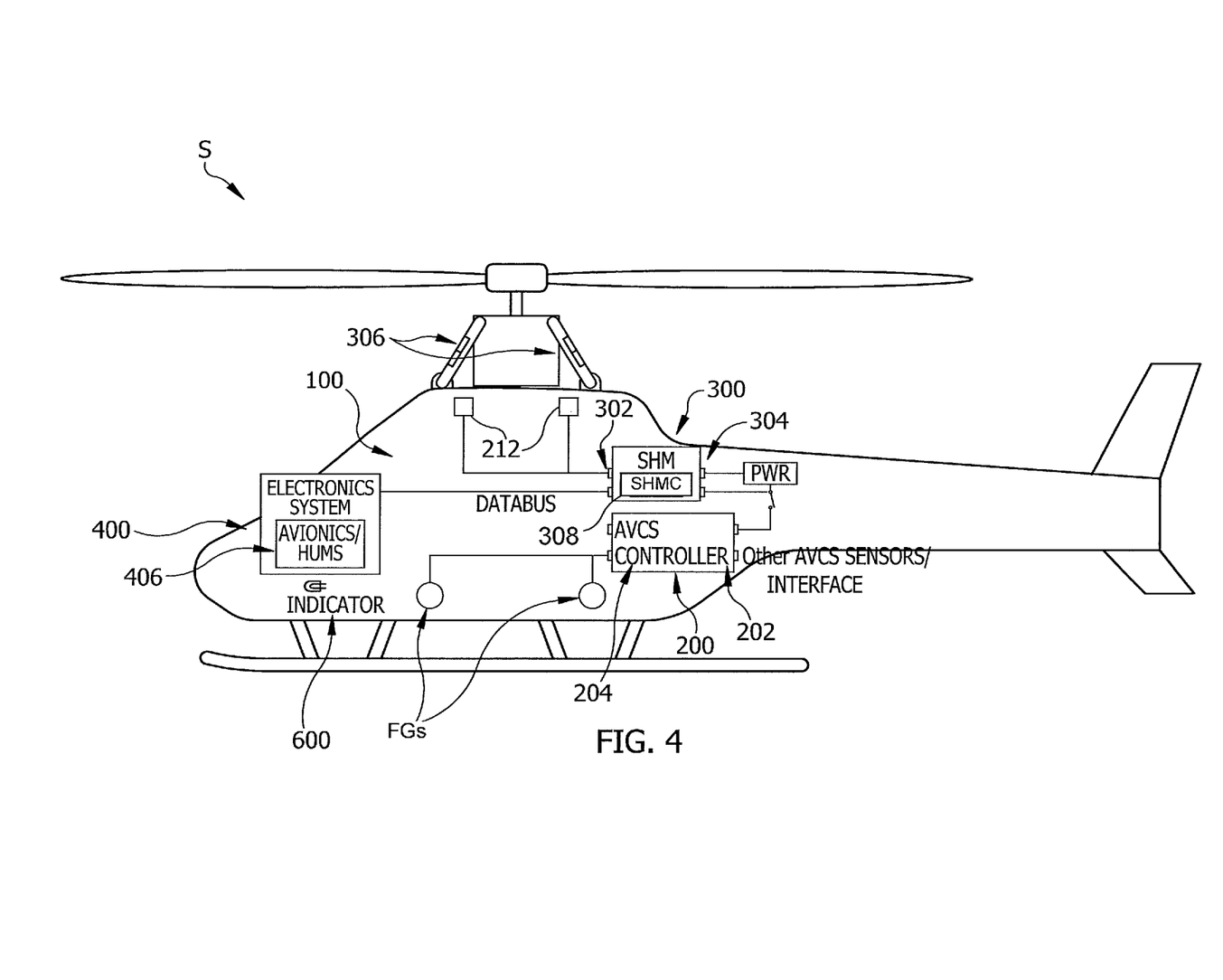

As part of this embodiment, SHM system 300 includes a plurality of SHM sensors (not shown, see e.g., FIGS. 2-4). At least some of the sensors provide for interaction with dedicated electronics, which, in turn, interact with other onboard avionics (e.g., electronics system 400) such as onboard Flight Controls or HUMS. The interaction of multiple subsystems (e.g., 200, 300, 400, FIG. 1A) may be accomplished via directly wired communication interfaces 500, wireless interactions via wireless communications interfaces 500, or by sharing data across a shared databus or a shared communications interface 500 (e.g., an ARINC 429, ARINC 825 (CAN), RS-422, or the like). Data such as structural strain, structural load, acceleration, FG force, etc. can be shared between SHM system 300, AVC system 200, and electronics system 400 via digital data busses (e.g., CAN, RS-422, ARINC 429, etc.) and/or wired or wireless interfaces.

Alternatively and in some embodiments, the sensors or sensor nodes of SHM 300 themselves may be directly compatible with the shared databus (e.g., 500) thus eliminating the need for dedicated SHM electronics (see e.g., FIG. 2) and/or a SHM controller. Similarly, the interaction between AVC system 200, SHM system 300, and any other electronics system(s) 400 can be accomplished by direct wiring therebetween or by participation on a shared databus. Another alternative includes sensors or sensor nodes of SHM system 300 that wirelessly communicate with controller 210 of AVC system 200, a controller of SHM system 300 (e.g., a SHM Controller (SHMC) 308, FIGS. 3-4) and/or a databus communication interface 500.

In some embodiments, AVC system 200 is configured to communicate information with SHM system 300 and other onboard avionics and/or electronics system(s) 400 such as onboard HUMS. The shared information is then used by SHM system 300 and HUMS (e.g., electronics system 400) to augment and enhance a database for structural health detection from which prognostication and/or exceedance information may be obtained.

In some embodiments, IFMS 100 is configured to detect an incorrect force via SHM, diagnose the FG that is applying an incorrect force, and disable power to AVC system 200 and/or components thereof (e.g., FGs) to mitigate generation and application of incorrect forces. SHM may be used to detect when a vibration threshold or duration is exceeded and/or to detect fatigue damage. Upon detecting incorrect force via SHM, either SHM system 300 and/or controller 210 are configured to remove power to FGs in response. SHM system 300 can directly disable the at least one FG via a command from a SHM controller (e.g., SHMC 308, FIGS. 3-4) or indirectly disable the at least one FG via a command issued through controller 210 when a failure is detected.

FIG. 1A is illustrative and that various components, their locations, and/or their functions described above in relation to FIG. 1A may be changed, altered, added, or removed. For example, some components and/or functions may be separated or combined into one entity, or some functionality therein may be segregated and/or integrated with any other entities associated with system 100.

Figure 1B:
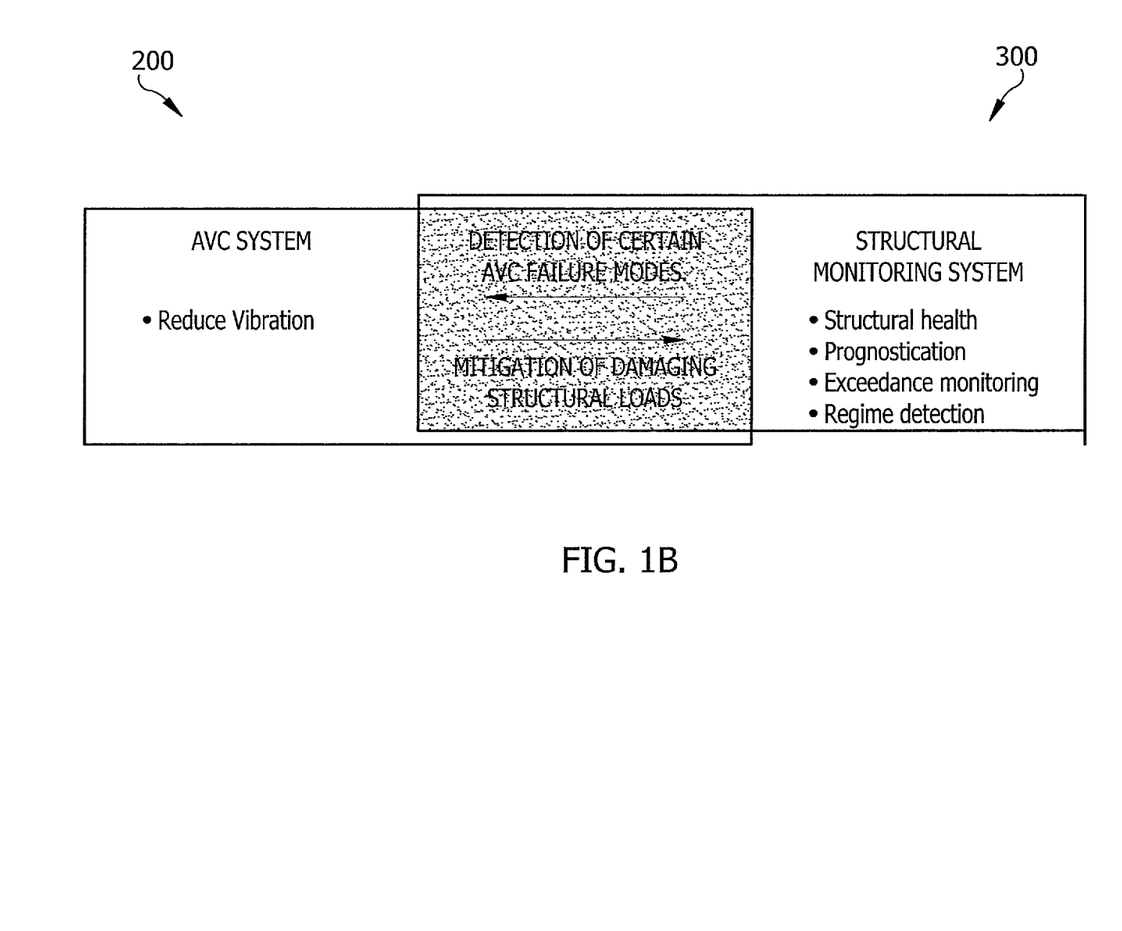
FIG. 1B is a schematic illustration of the mutually beneficial interaction of an Active Vibration Control (AVC) system and a Structural Health Monitoring (SHM) system for incorrect force mitigation.

FIG. 1B is a schematic illustration of the mutually beneficial interaction of AVC system 200 and SHM system 300 on a non-limiting example of an aircraft. In this embodiment, AVC system 200 reduces vibration at one or more rotor harmonics of the rotary aircraft. In some embodiments, AVC system 200 may mitigate damaging structural loads by modifying its control force solution as described in more detail below. Contemporaneously, and while AVC system 200 is reducing vibration, SHM system 300 is also collecting information and may comprise one or more of the following data monitoring elements: cracks; improper stiffness; excessive elongation; improper vibration; component measurements such as stress, strain, load or vibration; exceedance monitoring (e.g., exceedance of a threshold for any measured parameter); and/or detection of an operating regime such as weight-on-wheels (WoW), gross vehicle weight, flight conditions, maneuver loading, etc.

In some embodiments, SHM system 300 is configured to provide a user or operator with predictive or prognostication information regarding an estimate of the remaining useful component life for various structures and/or components. That is in some embodiments, SHM system 300 is configured to predict a remaining useful life of an aircraft (e.g., a rotary winged aircraft, helicopter, etc.) and/or components or structures thereof based upon the history or trends of one or more of the data or component measurements and detected operations information. Such information may be stored in a database and retrieved during service to the structure. Alternatively, such information may be indicated to crewmembers visually or audibly via one or more indicator lights or alarms. In yet another alternative, the data may be electronically communicated to an off-board electronic device (not shown) for further processing, cataloguing and/or analysis.

In some embodiments as FIG. 1B illustrates, the inventive interaction between AVC system 200 and SHM system 300 provides an improved system for detecting or diagnosing AVC system faults including incorrect forces generated via AVC system 200. The incorrect forces may then be mitigated by altering a control command and/or shutting off power to portions of AVC system 200 that are contributing to the system faults. This embodiment provides an additional monitor to AVC system 200 when the AVC Continuous Built In Test (CBIT) has difficulty recognizing such faults or has poor observability of certain faults (e.g., certain faults could typically be in the accelerometer (vibration info in FIG. 1) or accelerometer signal conditioning circuitry (input interface 202) to controller).

Additionally, SHM system 300 provides secondary and independent safety critical monitoring of faults associated with AVC system 200. In this embodiment, AVC system 200 is configured to directly incorporate both the SHM information (e.g., monitor structural stresses, structural loads) and vibration information and actively adjust FG output during normal operation to prevent damage to structure S (FIG. 1A), such as damage from dynamic loads controlled within a certain range, and simultaneously minimizing vibration. This can occur during normal operation of AVC system 200. In the event of a potentially damaging dynamic load to a structural member as measured by SHM system 300, AVC system 200 can revert to a modified control scheme to mitigate the damaging input. This entails employing a predetermined control scheme, or by directly using SHM system 300 sensors as feedback sensors.

FIGS. 2-4 are schematic illustrations and exemplary embodiments of a structure S having an IFMS 100. The IFMS 100 system comprising multiple subsystems including at least one AVC system 200 and at least one SHM system 300 for monitoring structural health as well as detecting and diagnosing incorrect forces as well as to provide incorrect force mitigation.

Referring to FIG. 2, an exemplary structure S comprising a helicopter is illustrated. Structure S includes an IFMS 100 comprising at least a SHM system 300 and an AVC system 200. SHM system 300 and AVC system 200 are configured to communicate and share information via a communications interface 500 comprising a databus. In this embodiment, SHM system 300 includes multiple strain sensing nodes disposed directly on the gearbox struts. Strain sensing nodes (e.g., strain sensors) are directly linked and/or directly compatible with the shared databus (e.g., 500) thus eliminating the need for additional dedicated electronics. This saves cost and reduces weight. In this embodiment, IFMS 100 includes SHM system 300 and AVC system 200 that are in electronic communication, whereby SHM system 300 consists only of structural strain/load measurement nodes that directly communicate with AVC system 200 wirelessly or via the shared databus 500. SHM system 300 includes a plurality of nodes and/or gauges configured to measure a stress, a strain, a load, and/or any other SHM parameter associated with the structural health of structure S, and communicate that parameter directly to AVC system 200.

AVC system 200 includes an AVC controller (e.g., 210, FIG. 1A) and multiple FGs (e.g., designated "FG"). Using the example helicopter, FGs are positioned to affect the strain in the gearbox struts. The placement or location of FGs can vary depending on the application and desired areas for vibration reduction and may be predetermined upon a determination of the best locations for imparting vibration cancelling forces, thus, some FGs are shown in broken lines. At least some of the FGs can be, but do not have to be placed around the fuselage structure, proximate the main rotor, proximate an engine, proximate a transmission, etc. SHM system 300, AVC system 200, and electronics system 400 comprising an AVIONICS/HUMS 406 are shown as serially communicating through an aircraft databus (e.g., communications interface 500). Through the databus, the plurality of subsystems (e.g., 200, 300, 400) can share data for the mutual benefit as described above in regards to FIG. 1B.

Having SHM system 300 being deployable directly on the main gearbox struts (e.g., without the need for any other electrical units or components) not only provides strain sensing capability on the main gearbox struts, but also provides information that can be used by AVC system 200 for detecting when the helicopter fuselage is supported by the main rotor (e.g., in flight) or when the helicopter fuselage is resting on the ground (e.g., Weight on Wheels (WOW)). Such information is usable for calculating the gross vehicle weight and dynamic maneuver loading. In this case, the information can be communicated to the AVIONICS/HUMS 406 and AVC system 200 to log or provide adjustments to flight controls or vibration control forces.

FIG. 2 illustrates a wired databus communications interface 500; however, each subsystem (e.g., 200, 300, and 400) may be configured with wireless communication interfaces for facilitating wireless communications. It will be appreciated that FIG. 2 is for illustrative purposes only and that various components, their locations, and/or their functions described above in relation to FIG. 2 may be changed, altered, added, or removed. For example, some components and/or functions may be separated or combined into one entity, or some functionality therein may be segregated and/or integrated with any other entities associated with system 100.

In the embodiment illustrated in FIGS. 3 and 4, separate SHM control components are used to collect and process the structural health of structure S. For example, a plurality of SHM sensors 306 is used in conjunction with a separate structural health processing module or a SHM controller (SHMC) 308. FIGS. 3 and 4 illustrate a plurality of SHM sensors 306 used with SHMC 308 for structural heath monitoring and protection. In FIG. 3, the SHM is conducted via strain gauges or strain sensors 306 mounted on the aircraft structure S. In FIG. 4, accelerometers 212 are used to indirectly monitor structural health. By locating accelerometers 212 about structure S, it is possible to correlate the vibration at the accelerometers 212 with the structural strain/load so that the load does not need to be measured directly. To select proper accelerometer 212 locations and orientations, the locations are correlated with critical fatigue loads of aircraft structure S. In the non-limiting example illustrated in FIG. 4, the location of accelerometers 212 is near the struts. Data analysis and simulation can confirm the placement of accelerometers 212 and testing provides for further refinement of IFMS 100. In some embodiments, accelerometers 212 include sensors associated with AVC system 200, the accelerometers 212 or sensors are configured to generate an electronic signal upon detecting a structural vibration. The signal is communicated to the controller (e.g., 210, FIG. 1A) and used to generate a force command for cancelling the structural vibration.

In the embodiment shown in FIGS. 3 and 4, SHM system 300 includes a SHMC 308 configured to receive at least one sensor input (e.g., accelerometer 212 and/or strain sensor 306) for monitoring structural health, a wired or wireless data communication bus or interface 500, and relays outputs for AVC power removal contactors, aircraft advisory/warning indicators, and/or AVC power removal detection. In this embodiment, SHM sensors 306 are configured to detect structural health, fatigue cycle counting, exceedance monitoring, and/or detection of certain AVC failure modes. SHM sensors 306 may include strain gauges configured to work in conjunction with a SHM controller or control module (e.g., a SHMC 308) or without a SHMC or control module as illustrated in FIG. 2.

Referring to FIG. 3, SHMC 308 comprises a SHM controller or control module that is used with designed-in high safety integrity (e.g., a Level A or a Level B Design Assurance Level per SAE ARP 4761, December 1996). In this architecture, SHM system 300 is designed with a higher design assurance that allows AVC system 200 and electronics systems 400 (e.g., AVIONICS/HUMS 406) to stay at a lower design assurance. SHMC 308 enables different methods for detect a structural health failure. By way of a non-limiting example, SHMC 308 is able to detect vibration or stress level exceedance and/or abnormal vibration or stress trend detection for diagnosing incorrect force. Using data loaded into SHMC 308 related to aircraft structure S, SHMC 308 is also configured to estimate a fatigue load that is integrated over time for structure S and/or a component associated with structure S for diagnosing incorrect force.

In this example embodiment, if SHMC 308 determines a structural health fault based upon input or non-input from a sensor, and reduces the FG force (e.g., via commands sent to controller 210) until the structural loads/vibrations become acceptable. This can be done in real-time transient conditions and/or in steady state conditions. Aircraft information such as forward flight speed, main rotor speed (tachometer), collective position (for helicopters), and/or engine torque can be received at AVIONICS/HUMS 406 via an avionics databus. The aircraft information received from the avionics databus may be used to ignore normal transients in the data to prevent false trips of the protection. FIG. 4 shows that if SHMC 308 cannot achieve an acceptable structural load/vibration level, then SHMC 308 can command controller 210 to disconnect power to the FGs, thereby disabling AVC system 200 and/or portions thereof. SHMC 308 can also alert the aircraft operator, via AVIONICS/HUMS 406 and/or through an indicator 600 (e.g., a visible or audible indicator, a light, etc.) that indicates to the pilot that AVC system 200 and/or components thereof have been shut down.

The interaction of AVC system 200 and SHM system 300 provides for the AVC system 200 to directly use structural health information obtained via SHM sensors 306 (e.g., strain sensors, load sensors, accelerometers, etc.) to disable AVC system 200 (or portions thereof) and protect structure S under failure conditions. SHM system 300 provides a separate monitor or monitoring system incorporated within S for providing for improving safety integrity. For example, many times higher safety criticality systems require two different systems to provide sufficient safety integrity. The addition of SHM system 300 to AVC system 200 thus provides a system with improved safety integrity with different systems providing the safety integrity.

Referring to FIG. 4, SHMC 308 can include five or more accelerometer or load sensor inputs, a data communications bus (also referred to as a databus), relays, voltage detection, etc. The relays may include three or more relays to include a power contactor, an advisory indicator, and a warning indicator. In some embodiments, SHMC 308 is configured to log and monitor accelerometer 212 data, detect incorrect force via SHM information and/or vibration information, and communicate instances of incorrect force to AVIONICS/HUMS 406 and/or an indicator 600 for alerting the operator (e.g., pilot, crew) of instances of incorrect force.

The example in FIG. 4 provides for the ability to do failure detection of the vibration limit exceedance and/or abnormal vibration detection. If incorrect forces are detected, SHMC 308 can command AVC system 200 to reduce forces (e.g., via an electronic command to controller) and/or shutdown AVC system 200 or portions thereof, as SHMC 308 is in electronic communication with a power switch. In either case of incorrect forces being detected, an operator (e.g., pilot) can be alerted the problem to prepare for a change in operating conditions or take other preventative actions.

The interaction between AVC system 200 and SHM system 300 provides for the AVC system to use structural health information obtained from strain sensors, load sensors, accelerometers, etc. to determine if AVC system 200 should be disabled, and use the data to protect the structure under failure conditions. The SHM system 300 includes a separate monitor, which provides for higher safety integrity. AVC system 200 combines vibration data with structural health information to actively protect structure S while simultaneously reducing vibration. This is done by commanding the adjustment of FG force levels (magnitude and/or phase) to maintain acceptable structural loads while minimizing vibration. By using accelerometers 212 to indirectly infer structural stresses or loads, AVC system 200 and SHM system 300 are both able to reduce unwanted and potentially damaging effects of vibrations caused by FGs or other components on the structure S. In this approach, AVC system 200 predicts the structural health as well as actively extends the life of structure S.

Still referring to FIG. 4 and in some embodiments, SHM system 300 provides an alternative monitor (e.g., SHMC 308) to monitor AVC system 200 when an AVC CBIT has difficulty recognizing AVC faults such as incorrect frequency and/or incorrect force. Additionally, SHM system 300 provides a secondary and independent safety critical monitoring of faults associated with AVC system 200. SHMC 308 may have designed-in high safety integrity (e.g., Level A or B Design Assurance Level per SAE ARP 4761). In this architecture, SHM processing modules SHM system 300 is designed with a higher design assurance that allows AVC system 200 and electronics systems 400 (e.g., AVIONICS/HUMS 406) to stay at a lower design assurance.

In some embodiments, SHM system 300 is configured to provide an indication of the structural health to the operator (e.g., a pilot or user), as well as command the shut down of AVC system 200 (e.g., portions thereof) where, for example, a vibration level is exceeded, a load level is exceeded, an abnormal vibration is detected, and/or an abnormal stress trend is detected.

In other embodiments, if SHM system 300 detects an exceedance of structural loads or unexpected trends, it can communicate such to AVC system 200 (e.g., via controller 210, FIG. 1A), which in turn instructs AVC system 200 to reduce the FG force and/or adjust the force command until the structural loads/vibrations become acceptable (e.g., at or below an acceptable level). This can be done in real-time transient conditions and/or in steady state conditions. To assist in proper AVC force reduction, flight regime information from AVC sensors and AVIONICS/HUMS 406 can be used. As an example, aircraft information such as forward flight speed, main rotor speed (tachometer), collective position (for helicopters), and/or engine torque can be used to determine expected loading and transient conditions. With this information, in conjunction with load information from SHM system 300, AVC system 200 can properly reduce its FG force output without over penalizing the AVC performance.

In some embodiments, if AVC system 200 cannot reduce the FG force such that acceptable structural loads/vibrations can be achieved, then SHM system 300 is configured to disconnect power to the FGs, thereby bypassing and/or disabling AVC system 200. As FIG. 4 illustrates, SHM system 300 is coupled to and is in electrical communication with a power source, and SHM system 300 is configured to switch power on/off to AVC system 200 and/or FGs as needed. SHM system 300 can also alert the aircraft operator, through the a AVIONICS/HUMS 406 interface and/or through an indicator 600 that AVC system 200 and/or FGs of system 200 are shut down as power supplied thereto is cut off, removed, or disabled.

In further embodiments, AVC system 200 can directly receive and utilize measurements from SHM sensors 306 of SHM system 300 (e.g., strain, load, acceleration, or the like) for determining and imparting vibration reduction. With this information, AVC system 200 can detect exceedance of a predetermined load and/or vibration and either turn off power to one or more FGs or reduce FG force as needed. SHM system 300 can alert the pilot (e.g., operator) and/or crewmembers that AVC system 200 and/or portions thereof (e.g., FGs) are shut down.

In another embodiment, AVC system 200 utilizes information (e.g., strain, load, acceleration, or the like) measured and received from SHM sensors 306 in combination with vibration data to both actively reduce vibration and protect structure S. For example, AVC system 200 and/or an AVC controller (e.g., 210, FIG. 1A) may use and implement an augmented control algorithm to adjust the FG force levels (magnitude and phase) to maintain acceptable structural loads while minimizing vibration. This can be accomplished by adding a term to the AVC algorithm cost function as shown in EQ. (1) below, $$J=u^*Ru+e^*Qe+y^*Ty \qquad \text{EQ. (1):}$$

where u is the FG force output(s), R is the weighting matrix for the FG force output, e is the AVC control sensor input(s), Q is the weighting matrix for AVC control sensors, y is the SHM load input(s), T is the weighting matrix for the SHM load input, and * is the Hermitian transpose operator. In some embodiments, the T matrix is also a function of y such that the weighting is small when y is below the critical structural load limit and increases sharply when a load measurement is at the critical structural load limit (e.g., which can be accomplished with a Sigmoid or Heaviside Step function). In other embodiments, the y*Ty portion of the cost function is only activated when a linear or quadratic combination of the SHM loads exceeds a given threshold (Γy or y*Γy).

To those skilled in the art of AVC, it is readily apparent and will understood how to use the gradient of this cost function to adaptively minimize vibration at the AVC control sensors while maintaining an acceptable loading on critical components that the SHM system 300 is monitoring. In this approach, the combination of AVC system 200 and SHM system 300 not only reduces vibration and monitors structural health, but also allows the systems to actively work together for extending the life of structure S and/or components thereof.

Figure 5:
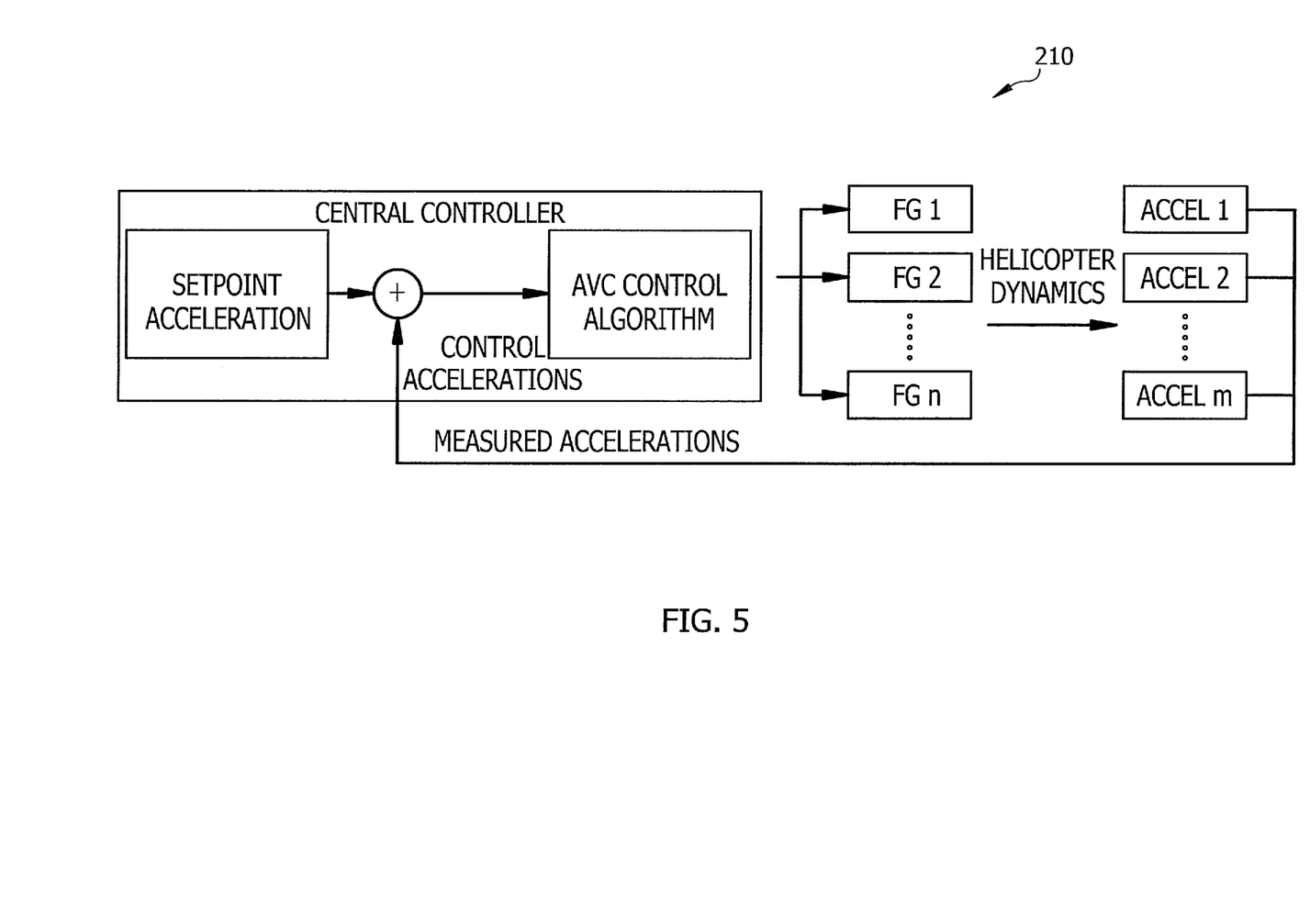
FIG. 5 illustrates a block diagram for an enhanced built in test (BIT) for incorrect force mitigation.

FIG. 5 is a block diagram of an enhanced built in test (BIT) conducted at a BIT module (e.g., 208, FIG. 1A) disposed within a central controller 210 of an AVC system. The BIT examines the health of the CFGs (e.g., FG1 to FGn, where "n" is a whole number integer >2) and AVC sensors (e.g. accelerometers, ACCEL1 to ACCELm, where "m" is a whole number integer >2) to detect incorrect force errors and mitigate any detected errors. In some embodiments, controller 210 is configured to conduct tests for detecting a failure mode that could cause structural damage. This failure mode, called incorrect force, occurs when FGs (e.g., FIGS. 2-4) in an AVC system (e.g., 200) provide a force magnitude and/or phase that increases vibration and/or structural stress on a structure instead of reducing it.

In some embodiments, the incorrect force failure mode can be caused by failures in the sensor (e.g., ACCEL1 to ACCELm), controller 210, FG (e.g., FG1 to FGn), and/or tachometer. This failure mode could affect one or multiple FGs. If an FG is located remote to the pilot, then incorrect forces generated thereby may go undetected for an extended period of time, resulting in accumulated structural damage. For the test shown in FIG. 5, it can be configured manually with a switch (called an initiated built in test (IBIT)), or it may be performed automatically at the start of every flight (called a power up built in test). If there is a fault determined from the test, then an indicator light can alert maintenance crew of the problem. A digital signal can also be sent via a digital aircraft bus (e.g., ARINC 429, MIL-STD-1553, or the like). If an incorrect force failure is determined, then the failure can be isolated to a specific FG, controller, and/or accelerometer.

In some aspects, BIT capability is imparted to controller 210 for allowing AVC system 200 to autonomously detect its own internal failures that may contribute to and/or directly result in structurally damaging incorrect force output. Some failure modes are difficult for controller 210 to detect through traditional BITs; however, FIG. 5 illustrates an enhanced IBIT sequence as described herein. Controller 210 is configured to detect, for example, damage to attachment of the FGs or sensors, or failures causing slow drift magnitude and/or phase error on the control sensors or FG errors.

The IBIT can be executed while the aircraft or structure is not operational and/or grounded. In one embodiment, controller 210 will inhibit or abort the IBIT if it detects a reference signal provided from an external disturbance source. A reference signal is a signal that is correlated with the frequency or frequencies of the disturbance source, and indicates to the system that the aircraft or structure is in an operating mode.

In some embodiments, controller 210 utilizes a setpoint test methodology. The setpoint consists of an artificial disturbance and reference signal that injected into an AVC control algorithm. Controller 210 artificially generates a valid tachometer and disturbance and command FG forces, which attempt to control the artificial disturbance input.

During the IBIT, the AVC controller 210 processes the vibration created by the FGs using its control sensors (e.g., accelerometers). It takes these readings and sums them with the artificial setpoint as shown by the "+" sign in FIG. 5. The AVC control sensors are referred to as accelerometers, however, other control sensors may also be used (e.g., velocity or load sensors).

In one embodiment, the artificial disturbance is set based on the previously measured system response of each FG and accelerometer. To simplify the test, a setpoint disturbance that is controllable by controller 210 is selected. This can be done by multiplying a vector of desired output forces by the inverse of the actuator-accelerometer transfer matrix.

In some embodiments, a method of conducting the enhanced IBIT according to FIG. 5 comprises initializing all FGs, neutralizing all FGs, applying a computed setpoint disturbance, $d_{setpoint} \epsilon C^m$, summing the $d_{setpoint}$ value with an actual accelerometer measurement, computing an initial setpoint acceleration, $a_{initial} \epsilon C^m$ by summing the $d_{setpoint}$ value with an actual accelerometer measurement, turning on the vibration control algorithm, allowing a FG force command to settle for a configured settle time, $t_{settle}$, computing an $a_{final} \epsilon C^m$ value and a $F_{final} \epsilon C^n$ value, switching the vibration control algorithm off, and running a fault identification algorithm as described below.

In some embodiments, the AVC system (e.g., via controller 210) can perform the IBIT on a single FG force at a time. All FGs can be active but only one FG force may be commanded at a time. AVC controller 210 is configured to record the initial control acceleration while all FGs are enabled and neutralized. Then, during each FG test of the IBIT, controller 210 can wait a configurable settling time for the AVC algorithm to converge on a steady force solution.

In some embodiments, an IBIT is conducted on an AVC system via an AVC controller 210; the AVC system can have at least one FG and at least one AVC sensor (accelerometer). The IBIT allows for closed-loop test capability for detecting failure modes (e.g., failures in sensors, FGs, controller, drifts in phase/magnitude, etc.) that may contribute to incorrect force. The IBIT is configured to detect loss of operation and erroneous operation failures of each sensor (accelerometer) and/or FG. In some embodiments, the IBIT is configured to detect and correct errors in the internal algorithm System Model.

Figure 6:
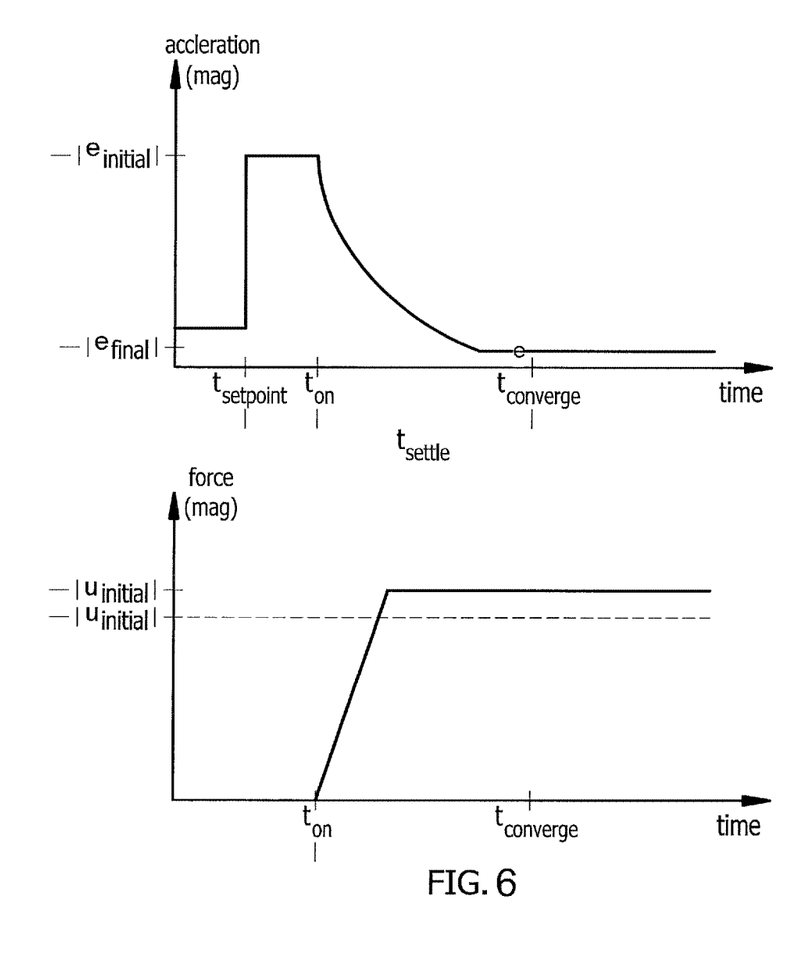
FIG. 6 graphically illustrates a representation of how an acceleration and force signal converge during built in testing of an AVC system.

FIG. 6 is a graphical representation of how an acceleration and force signal may converge during a single FG setpoint test. Additionally, if the acceleration and force values at the end of the settle time have not converged, AVC controller 210 will flag an IBIT Path Convergence fault and apply a constant pre-determined force command to determine the final accelerations.

In one embodiment, AVC controller 210 estimates a system transfer matrix (or System Model) between each accelerometer and actuator (FG) by calculating the initial control acceleration, final control acceleration, and final control force according to EQ. (2), $$C=(e_f-e_i)/u_f \qquad \text{EQ. (2)}$$

where e represents the complex Fourier Coefficients of the AVC control sensors and u represents the complex Fourier Coefficients of the force output. Once the estimated System Model matrix is calculated, it can be compared versus a previously measured System Model.

AVC controller 210 is configured to calculate the magnitude and phase error of the estimated System Model with respect to a previously taken System Model. AVC controller 210 then identifies the System Model elements with magnitude and/or phase errors greater than the configured thresholds. An element in this case is considered the response of a single accelerometer driven by a single FG.

In some embodiments, AVC controller 210 is also looking for weak elements in the estimated System Model by checking to see if magnitude elements in the System Model are below a determined threshold. If any elements are determined to be weak, AVC controller 210 will skip over those elements when comparing the System Model phase and magnitude errors. If all of the accelerometer elements for a given FG force excitation (for each frequency) are identified as weak, then AVC controller 210 can flag a FG Weak Path IBIT fault condition. If all of the FG force elements for a given accelerometer (for each frequency) are identified as weak, then AVC controller 210 can flag an Accelerometer Weak Path IBIT fault.

Additionally, AVC controller 210 can flag an accelerometer IBIT fault if System Model errors (magnitude or phase) for a given accelerometer are identified on more than half of the enabled FG forces at a given frequency. Likewise, AVC controller 210 will flag a FG Force IBIT fault if System Model errors (magnitude or phase) for a given FG force are identified on more than half of the tested accelerometer elements at a given frequency.

Figure 7:
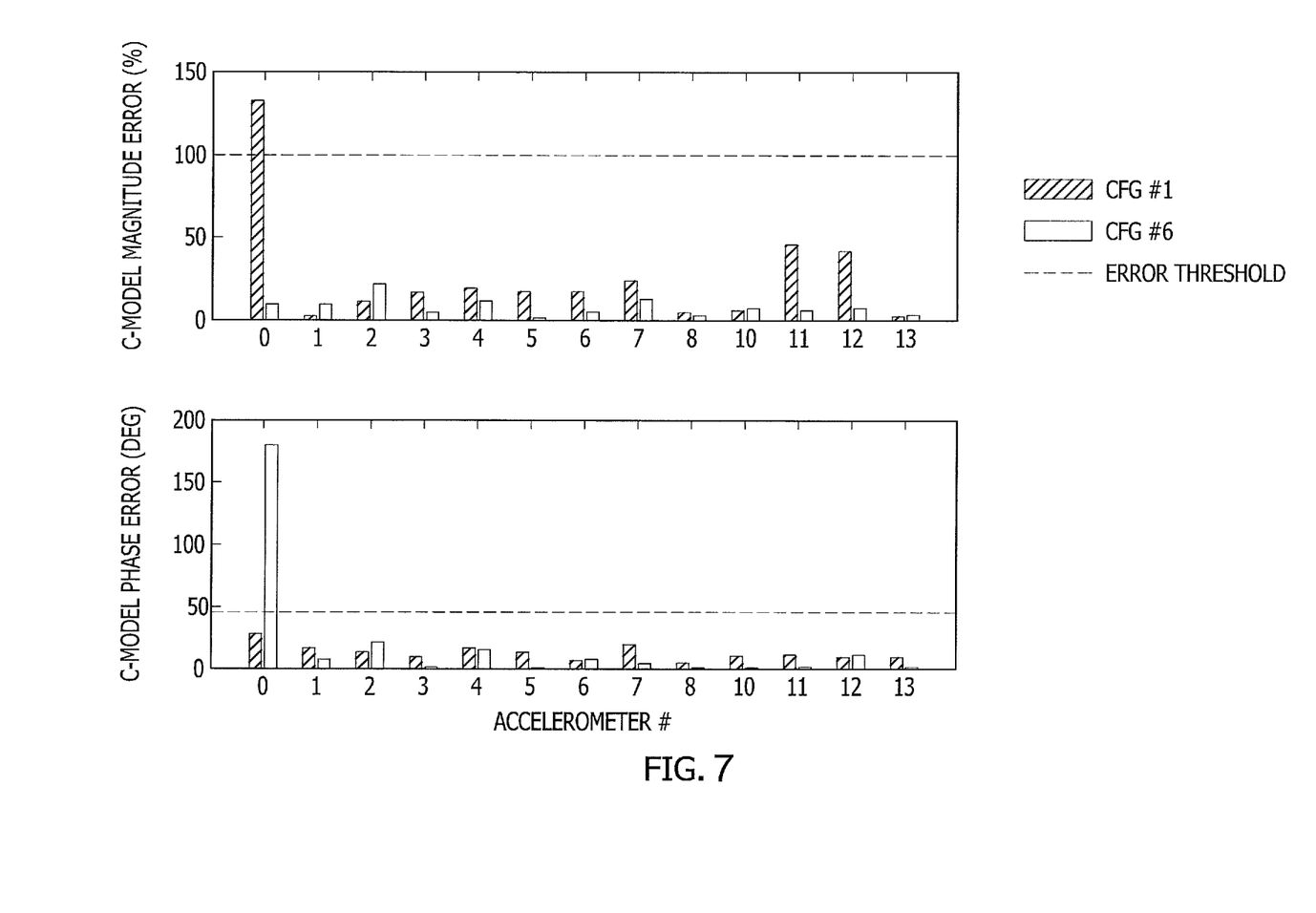
FIG. 7 graphically illustrates a phase and magnitude error of test sequence for an enhanced BIT for detecting an incorrect force failure mode.

FIG. 7 shows exemplary laboratory test results of the method from FIG. 5. In this case, sensor 0 has a 180-degree phase change. FIG. 7 shows an error in the transfer function (called a System Model) that corresponds with sensor channel 0 as being above the threshold for error (e.g., above the dashed line). The other accelerometer channels are not indicated as failed, as each is below the threshold or error (e.g., below the dashed line).

If an IBIT fault is detected on any of the AVC components (e.g., sensors, FGs, controller, etc.) the original stored System Model will be replaced by the estimated System Model and the IBIT repeated. If the fault(s) occur after the IBIT has been run a second time, any fault(s) can be declared as a higher-level fault and logged.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. A method of providing structural health monitoring and protection, the method comprising: providing an Active Vibration Control (AVC) system, comprising: at least one force generator (FG); at least one sensor detecting a structural vibration and generating a signal upon detecting a structural vibration; a controller in electronic communication with each of the at least one FG and the at least one sensor, wherein the controller receives the signal, generates at least one force command, and electronically communicates the at least one force command to the at least one FG, the electrical communication of the at least one force command causing the at least one FG to cancel the structural vibration; providing a Structural Health Monitoring (SHM) system comprising at least one structural health sensor detecting and measuring structural health information, the structural health information comprising at least one of structural load, a strain, or a vibration, wherein the at least one structural health sensor is separate from the at least one sensor of the AVC and generates a signal of the measured structural health information; communicating the measured structural health information from the SHM system to the controller in the AVC system via a communications interface disposed therebetween; within the controller, processing the signal communicated from the AVC system and the measured structural health information from the SHM system; correlating the structural health information with the structural vibration of the AVC system and determining if an incorrect force indicating an exceedance of at least one of structural load, a strain, or a vibration is being applied to a structure by the at least one FG, and if incorrect forces are being applied to a structure, then; determining and generating a corrective force command to mitigate the incorrect force at the controller; communicating the corrective force command to the FG; generating a corrective force with the FG based upon the corrective force command.

2. The method of claim 1, wherein providing the at least one FG comprises providing at least one circular force generator (CFG), at least one linear FG, or a combination of at least one CFG and at least one linear FG.

3. The method of claim 1, wherein providing the at least one sensor for measuring structural vibration comprises providing at least one accelerometer.

4. The method of claim 1, wherein providing the at least one structural health sensor comprises providing at least one of a strain gauge, a tachometer, a load measurement node, or an accelerometer.

5. The method of claim 1, wherein communicating structural health information comprises a communicating via at least one of a wired connection, a databus, or a wireless connection.

6. The method of claim 1, wherein the exceedance of at least one of structural load, a strain, or a vibration further comprises measuring at least one structural load parameter using the at least one structural health sensor and electronically communicating the at least one structural load parameter as the structural health information from the SHM system to the controller.

7. The method of claim 6, wherein measuring at least one structural load parameter comprises measuring at least one of a crack, a stiffness, an elongation, a vibration, a stress, a strain, or a load.

8. The method of claim 7, further comprising estimating a remaining useful component life of an aircraft structural component.

9. The method of claim 1, further comprising providing an electronics system in electrical communication with the AVC system.

10. The method of claim 9, wherein providing an electronics system comprises providing an onboard Avionics/Health Usage and Monitory System (HUMS).

11. The method of claim 10, further comprising communicating aircraft information received from an avionics databus regarding an operating regime to the AVC system via the Avionics/HUMS.

12. The method of claim 11, wherein communicating the aircraft information received from the avionics databus includes communicating at least one of a weight-on-wheels (WoW), a gross vehicle weight, a maneuver loading, a forward flight speed, a main rotor speed, a collective position, or an engine torque.

13. The method of claim 1, further comprising detecting a failure of the AVC system via the at least one structural health sensor and disabling the at least one FG when the failure is detected.

14. The method of claim 1, further comprising adjusting the at least one force command using information communicated by the SHM system for staying below a critical structural load limit.

15. The method of claim 1, further comprising, at the controller, receiving electronic communications and communicating an adaptive vibration control force to the FG thereby minimizing vibration, actively maintaining structural loads below a critical structural load limit.

* * * * *